United States Patent
Bonura et al.

(10) Patent No.: US 6,619,557 B1
(45) Date of Patent: Sep. 16, 2003

(54) HIGH-EFFICIENCY SYSTEM FOR THE THERMOREGULATION OF A ROOM BY SILENT RADIANT PANELS, PARTICULARLY EQUIPPED TO OPERATE AS DOORS

(76) Inventors: Giuseppe Bonura, Corso Dei Milla, No. 510, Partinico (PA) (IT), 90047; Marco Bonura, Corso Dei Mille, No. 510, Partinico (PA) (IT), 90047; Vanessa Bonura, Corso Dei Mille, No. 510, Partinico (PA) (IT), 90047; Francesca Di Franco, Corso Dei Mille, No. 510, Partinico (PA) (IT), 90047

(*) Notice: Subject to any disclaimer, the term of this patent is extended or adjusted under 35 U.S.C. 154(b) by 11 days.

(21) Appl. No.: 10/178,765

(22) Filed: Jun. 25, 2002

(51) Int. Cl.[7] ................................................. F24H 9/06
(52) U.S. Cl. ............................. 237/70; 165/45; 237/73
(58) Field of Search ............................. 237/70, 79, 16, 237/73; 165/45, 144, 168

(56) References Cited

U.S. PATENT DOCUMENTS

| | | | |
|---|---|---|---|
| 2,051,769 A | * 8/1936 | Keighley | 62/516 |
| 2,521,475 A | * 9/1950 | Nickolas | 165/168 |
| 3,353,592 A | 11/1967 | Di Paolo | |
| 4,250,957 A | * 2/1981 | McClendon | 165/45 |
| 4,344,411 A | * 8/1982 | Dearborn | 126/34 |
| 5,771,964 A | * 6/1998 | Bae | 165/144 |
| 6,016,864 A | * 1/2000 | Bae et al. | 165/144 |

FOREIGN PATENT DOCUMENTS

| | | |
|---|---|---|
| DE | 32 33 256 | 3/1984 |
| EP | 0 409 739 | 1/1991 |
| EP | 0 448 473 | 9/1991 |
| EP | 1 167 890 | 1/2002 |
| FR | 2 349 811 | 11/1977 |
| FR | 2 504 667 | 10/1982 |
| GB | 918942 | 2/1963 |
| GB | 2 156 063 | 10/1985 |
| GB | 2199 401 | 7/1988 |

* cited by examiner

Primary Examiner—Ira S. Lazarus
Assistant Examiner—Derek Boles
(74) Attorney, Agent, or Firm—Young & Thompson

(57) ABSTRACT

A system for the thermoregulation of a room, including radiant panels, wherein the radiant panels are built up from thin rectangular cross-section channel elements which are assembled side-by-side, by inserting them by extremities thereof into slits made in two manifolds for feeding them with thermovector liquid. The radiant panels and frame element are endowed with complementary lock elements and with hinge elements for hinging a radiant panel on the frame elements. The hinge elements include hinged hydraulic fittings, and the frame elements are endowed with hydraulic fitting elements for a connection to a thermovector liquid feed circuit.

8 Claims, 5 Drawing Sheets

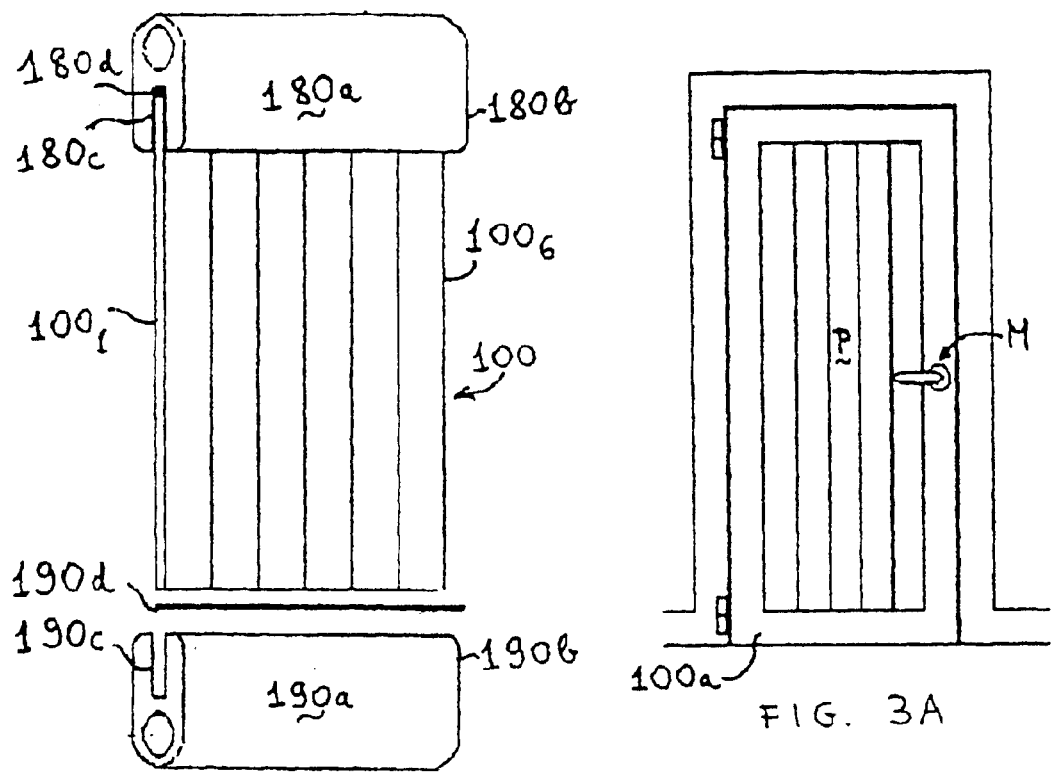
FIG. 2
FIG. 3A
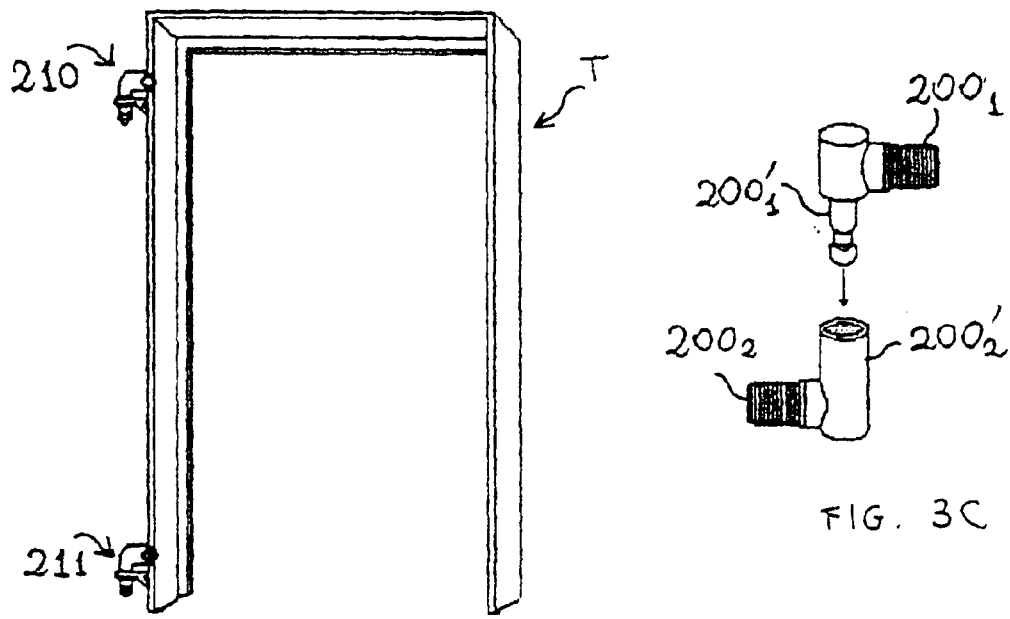
FIG. 3B
FIG. 3C

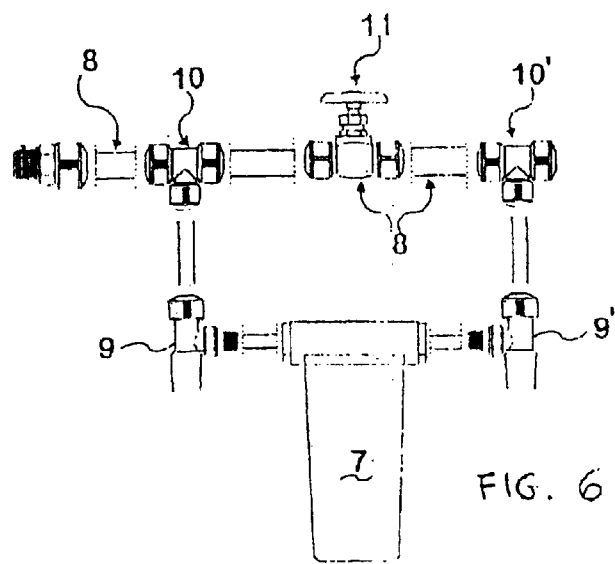
FIG. 6
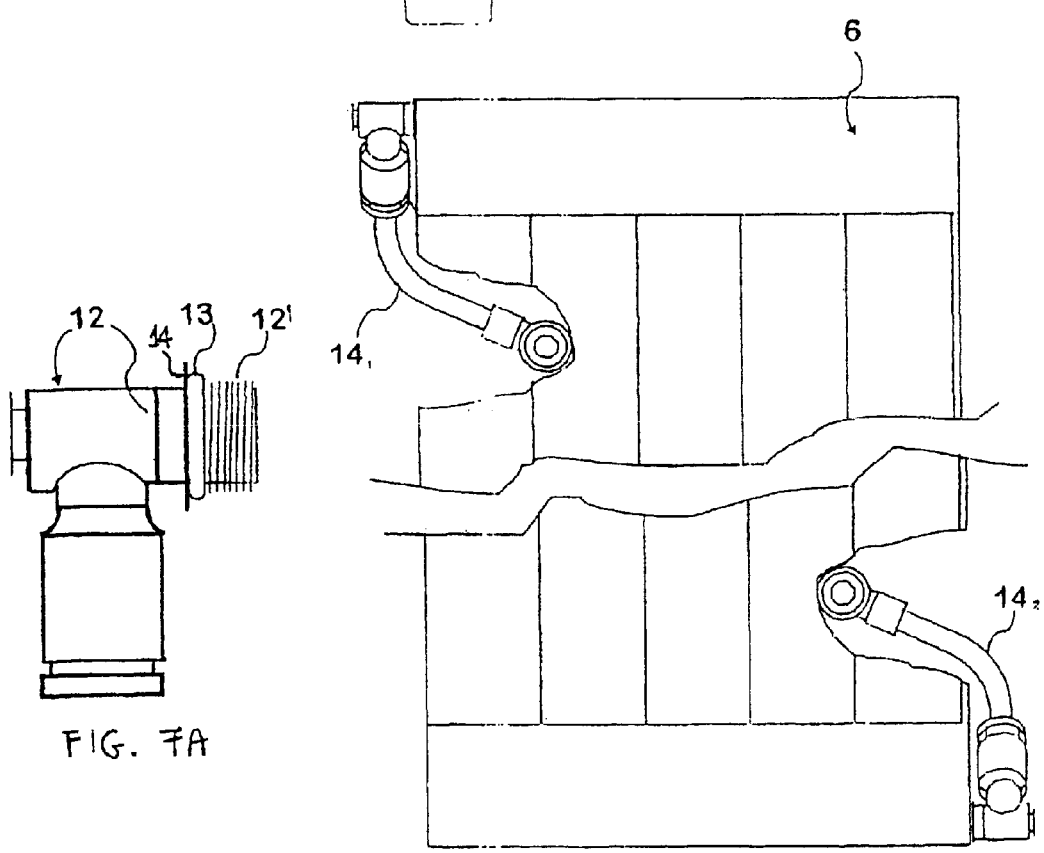
FIG. 7A
FIG. 7B

HIGH-EFFICIENCY SYSTEM FOR THE THERMOREGULATION OF A ROOM BY SILENT RADIANT PANELS, PARTICULARLY EQUIPPED TO OPERATE AS DOORS

TECHNICAL FIELD

This invention relates to the field of the thermoregulation of a room with radiant panels.

BACKGROUND OF THE INVENTION

It is known that the comfort of man in a room derives to a large measure from heat transferred by radiation. Therefore, systems for the conditioning of a room have been developed aiming at thermal radiation, instead of at thermal convection. Through thermal radiation it is possible to carry out both the heating and the cooling of a room.

In the aforesaid systems the function of transferring heat to a room is performed by panel structures, i.e. radiant panels, especially wall radiant panels. An efficiency is associated with such radiant panels. The higher is the portion of heat which a radiant panel can transfer to a room by radiation, instead of by convection, and the quicker is the response of the radiant panel to the activation of a thermovector liquid source that feeds it, the higher is the efficiency of the radiant panel.

OBJECTS, CHARACTERISTICS AND ADVANTAGES OF THE INVENTION

It is the general object of this invention to provide a system for the thermoregulation of a room with radiant panels, which turns out to be substantially more efficient and functional with respect to those of the state-of-the-art.

It is a particular object of this invention to provide a thermovector liquid radiant panel which is of an efficiency higher than those known at present, i.e. which is affected by a lesser withdrawal of the heat transferred by it to a room, due to the convective motions of air; which needs a lesser heating or cooling to bring a room to a given temperature, and which has a faster response to the switching-ON of the energy source that transfers heat to the thermovector liquid.

It is also an object of this invention to provide a radiant panel having a strong and elastic construction, and which is not noisy, especially in thermal transient conditions.

Such objects are reached by radiant panels made up by assembling discrete rectangular cross-section channel elements that entirely sweep the radiant surface of a panel. Such a characteristic gives the advantage of allowing to reach a very high efficiency. In fact, the so realized guiding of the thermovector liquid flow through rectangular cross-section channels allows to reduce turbulence in the thermovector liquid flow—and so to increase heat exchange therewith—as the rectangular cross-section is made thinner and thinner and so the thermovector liquid flow approaches to a blade flow.

The discrete channel elements are forced through gaskets in a top and a bottom manifold, without any welding. Such a characteristic allows each channel to undergo its own thermal expansion/contraction independently of the other ones, with the advantage that a radiant panel does not undergo deformations, especially in transient conditions. This also eliminates noise in the operation of the radiant panels.

It is also an object of this invention to provide a radiant panel which can be inserted in an interior of a room without determining an additional encumbrance.

Such an object is reached by equipping a radiant panel with frame means, lock means and hydraulic fitting hinge means. So the panel can also operate as a door, arranged in a door space. Moreover, a so arranged panel can thermoregulate two rooms seen from the same door.

A system for the thermoregulation of a room according to this invention is equipped with a thermostat including a case and a thermosensitive element having a cylindrical shape and being arranged on the case. By arranging the cylindrical thermosensitive element vertically, the best perception of radiant heat and the minimum influence from air convective motions are realized for the thermostat.

Another contemplated characteristic are a counter for counting the activation times of the source and a warning light, arranged on a panel, for signalling the ON/OFF state of the source, radiocontrolled from the source.

This characteristic allows one to intervene on malfunctions of the system—which reduce the efficiency of the same—at once, when not a regular course of the switched-ON state of the same is detected.

Another characteristic envisaged by this invention is to provide a system for the thermoregulation of a room with a tank containing a liquid against carbonaceous deposits, shunted to the return piping of the system.

By this feature the efficiency of the system is again increased, because carbonaceous deposits and corrosion of the source are a critical efficiency reducing agent.

Gasketed quick fittings are provided for connecting the radiant panels to the delivery and the return piping.

By virtue of such feature the fittings are such that losses of thermovector liquid are prevented.

It is still a particular object of this invention to provide means for the mounting of the radiant panels onto a wall, in which means vibration is not excited during the operation of the system.

To this object a lower and an upper header-covering and templates are provided. The templates are to be hooked to a wall. The header-coverings have legs to be engaged with wings of the templates to support a panel onto the wall through the cooperation of blocklets.

SUMMARY OF THE INVENTION

Therefore it is the subject of this invention, in a system for the thermoregulation of a room, including a source for feeding a thermovector liquid; radiant panels wherein said thermovector liquid passes; pipings for delivering/returning thermovector liquid to/from said radiant panels; each radiant panel including a first manifold; a second manifold, and, between the first manifold and the second manifold, a radiant element which has two radiating front surfaces and a width from the one to the other radiating surface; an interior, and, in such interior, parallel contiguous rectilinear channels having a rectangular cross-section and entirely sweeping said radiating front surfaces with respective radiating sides, from the first to the second manifold; said channels being each one in liquid communication with said manifolds through respective ports provided in the manifolds;

the improvement wherein said manifolds have respective eccentric profiles endowed with respective slits, wherein said ports open, and said radiant element is built by inserting discrete channel elements, each one confining in an interior thereof one of said parallel contiguous rectilinear channels having a rectangular cross-section, into said slits by opposite extremities thereof, the channel elements being forced into the slits through gasket means and being arranged in a side-by-side relationship; and wherein said channels have the lesser side of the rectangular cross-section thereof in the direction of the width of the radiant panels.

It is envisaged that the panels are endowed with frame means fit for receiving a radiant panel in an interior thereof; the frame means and the radiant panels being endowed with respective complementary lock means and with hinge means for hinging a radiant panel on the frame means, the hinge means including hinged hydraulic fittings, and the frame means being endowed with hydraulic fitting means for a connection to a thermovector liquid feed circuit.

It is also envisaged that the system for the thermoregulation of a room further includes thermostat means to control the switching ON/OFF of said source, which thermostat means include a case and a cylindrical thermosensitive element arranged outside said case, upon it, the axis of symmetry of the thermosensitive element intended to be arranged in a vertical position in a mounting position of the thermostat means.

It is further envisaged that the system for the thermoregulation of a room further includes a radio transmitter and a counter for counting the times of activation of the source; and a radio receiver, and a warning light arranged on a radiant panel; the radio transmitter signalling the ON/OFF state of the source to the radio receiver and correspondingly determining the ON/OFF state of said warning light.

It is further envisaged that the system for the thermoregulation of a room further includes a tank for a liquid against carbonaceous deposits, which tank is shunted to the return piping, through two check-valves, a gate valve being mounted on the branch of return piping on which the shunt insists, to stop/reenable the flow of thermovector liquid.

It is further envisaged that in the system for the thermoregulation of a room, said radiant panels are connected to said delivery and return pipings through gasketed quick fittings.

It is envisaged that said radiant panels are equipped with lower and upper header-coverings, having such a length as to project beyond the sides of a panel when mounted on them; which header-coverings are endowed with respective upper and lower legs, and are equipped with templates that include a L-profile having a wing to be hooked to a wall and a support wing that has continuous parallel ridges fit for supportingly engaging said upper legs, and equipped with blocklets to be mounted between said support wing and said lower leg, receiving this one in a groove provided in the blocklets themselves.

According to a particularly preferred embodiment, the channel elements are made up of polycarbonate.

BRIEF DESCRIPTION OF THE DRAWINGS

This invention will be fully understood based on the following detailed disclosure of embodiments. thereof, only given as a matter of example, absolutely not of restriction, of the teachings thereof., with reference to the annexed drawings, wherein:

FIG. 2 is an overall front view, partially exploded, of an inventive radiant panel;

FIGS. 3A, 3B and 3C show an equipment for making an inventive radiant panel fit for its use as a door;

FIG. 6 shows a system for adding a liquid against carbonaceous deposits according to this invention;

FIGS. 7A and 7B respectively show a quick insertion fitting and the connection of a radiant panel to the delivery/return pipings through quick insertion fittings according to this invention;

DETAILED DISCLOSURE OF THE INVENTION

Figure 1:
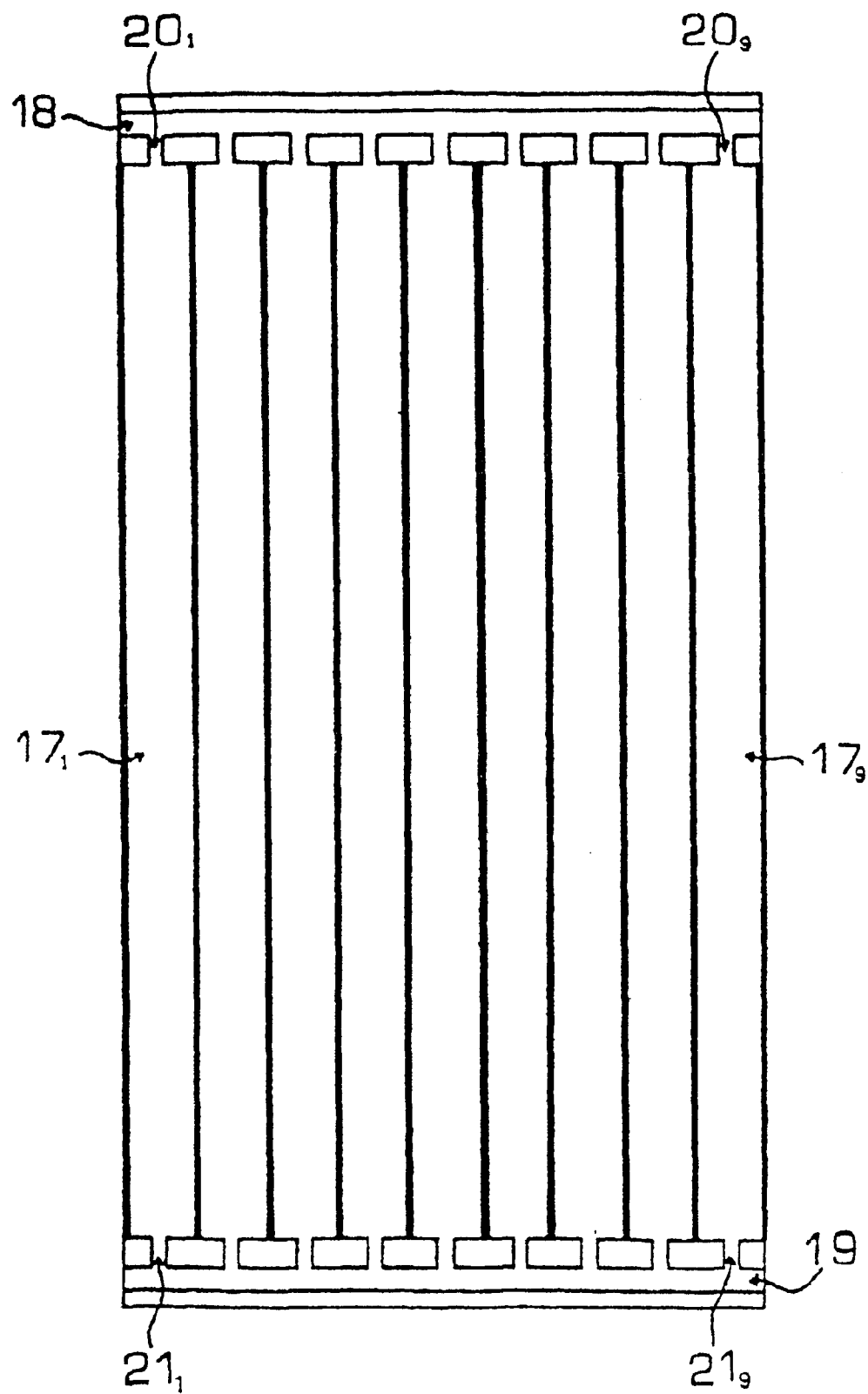
FIG. 1 is a front view of the inside of an inventive radiant panel.

Referring to FIG. 1, an inventive radiant panel includes a first manifold 18 and a second manifold 19, intended to arrange themselves in an upper position and in a lower position respectively; and rectilinear channels $17_1$ to $17_9$ that develop themselves from the first to the second manifold, intended to arrange themselves vertically. The channels are arranged side by side, have a rectangular cross-section, for instance of 1 cm by 3 cm, having its lesser side laying in the direction of the width of the panel, and entirely sweep from inside the panel front, radiant walls arranged between the two manifolds. The manifolds are in liquid communication with the channels, to feed them with thermovector liquid, through respective ports $20_1$ to $20_9$ and $21_1$ to $21_9$, that open themselves along the development of the manifolds. The sum of the volumes of the ports of each manifold is lesser than the volume of each manifold.

Referring to FIG. 2, it can be seen that bodies 180a, 190a of the manifolds outerly have eccentric profiles 180b, 190b, eccentric meaning eccentric with respect to the flow pipe they confine in their interior. Eccentric profiles have respective slits 180c, 190c whereinto the aforesaid ports open. Radiant element 100 is made up by mounting discrete channels elements, such as box elements, $100_1$ to $100_6$ with their extremities into said slits, in a side-by side relationship. The channel elements are forced into the slits through gaskets, such as gasket 190d. So the assembling of the channel elements turns out to be free of solderings. Preferably the channel elements are made up of polycarbonate.

With reference to FIGS. 3A, 3B and 3C an embodiment is shown of the radiant panel fit for performing a further, door function. Panel P is endowed with a frame 100a on its periphery. As depicted in FIG. 3A, the frame can confine the manifolds in its interior. The so framed panel is also equipped with a wall frame T, as can be seen in FIG. 3C, fit for receiving it in an interior thereof. In the frame and in the wall frame complementary portions are assembled of a lock including a handle M. The framed panel and the wall frame are endowed with complementary hinges for hinging the panel onto the wall frame. The hinges are made up of hinge hydraulic fittings 101, 102, as can be ssen in FIG. 3C. They include two pipe fittings $200_1$ and $200_2$ respectively endowed with a pivot $200_1$' and with a seat $200_2$' fit for pivotedly receiving the pivot. A pipe fitting is intended to a direct connection with a manifold, the other one to the connection to a liquid thermovector intake, and to this end the fittings can be threaded. The pivot and the seat have through-holes inside them to determinate a liquid communication between the fittings. The pivot and the seat can include check valves that open themselves upon inserting the pivot into the seat and close themselves upon uninserting the pivot from the seat. Wall frame T is endowed with intakes 210, 211 connected to a liquid thermovector piping.

Figure 4:
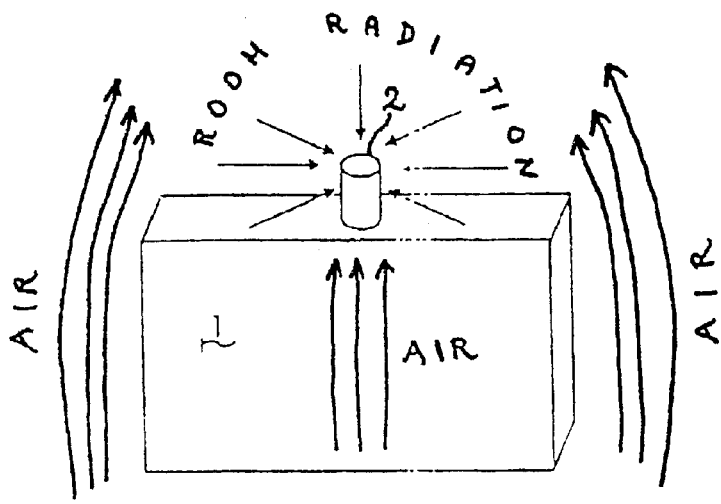
FIG. 4 schematically shows a thermostat according to this invention.

As is illustrated in FIG. 4, the inventive thermostat includes a case 1 and a cylindrical thermosensitive element 2 arranged outside it, onto it. The thermosensitive element is intended to arrange itself with its symmetry axis in a vertical position, so as to cut room thermal radiation normally, to the lateral surface thereof.

Figure 5A:
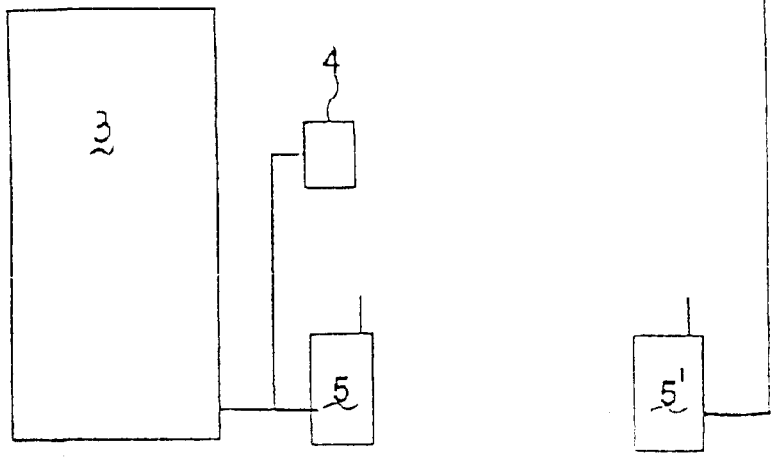
FIGS. 5A and 5B schematically show a monitor apparatus according to this invention.
Figure 5B:
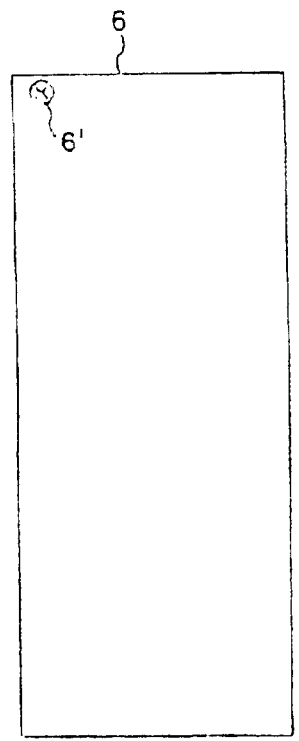

As illustrated in FIGS. 5A and 5B, the equipment for monitoring the activation times of source 3 includes a radio transmitter 5 for transmitting a source ON/OFF state signal and a radio receiver 5' connected to a warning light 6' arranged on a radiant panel 6. Such a warning light can be a light emitting diode or LED. The monitor equipment also includes a counter 4 for counting the source activation times. Transmitter 5 and counter 4 are activated by a relais connected to the source.

Referring to FIG. 6, the system for adding the liquid against carbonaceous deposits include a screw tank 7 shunted to a return (to the source) piping 8. trough "T" pipe fittings 10, 10' at the two ends of the shunt connection. Respective check valves 9, 9' are inserted on the two branches of the shunt connection. A gate valve is inserted on the piping branch 8' whereupon the shunt connection insists. Once screw tank 7 has been filled with liquid against carbonaceous deposits, check valves 9, 9' are opened and gate valve 11 is closed. Subsequently gate valve 11 is opened again and check valves are closed again.

As illustrated in FIG. 7A, a quick pipe fitting 12, known in the art, including a threaded head pipe fitting 13, according to this invention is endowed with gasket means on an outer thereof with a check ring 14 to prevent thermovector liquid leakages. As illustrated in FIG. 4B, the connection of a panel 6 to the piping of the thermoregulation system takes place with two pairs of pipe quick fittings. Pipe quick fittings 12', 12" are respectively connected to a head and a bottom manifold of a radiant panel 6, and through respective flexible hoses 15', 15" they are connected to other pipe quick fittings $12'_1$, $12''_1$ respectively connected into delivery/return pipings of the thermovector liquid feed circuit of the thermoregulation system.

Figure 8:
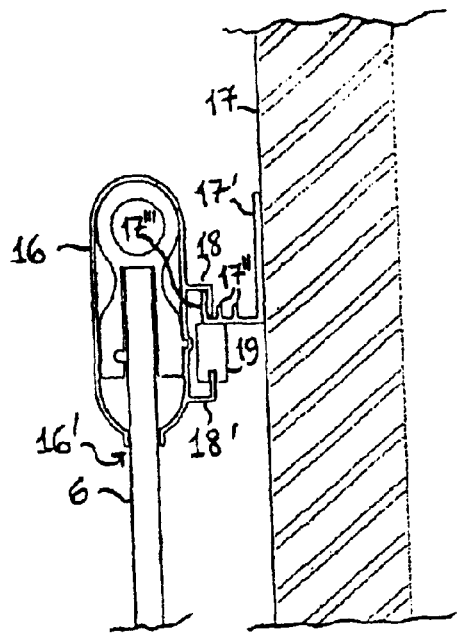
FIG. 8 schematically shows in cross-section view, a header-covering for radiant panels in a condition hooked onto a wall according to this invention.

FIG. 8 shows a header-covering 15 for radiant panels. It includes a sheath which is continuous in a longitudinal direction with a slot 16' for tightly receiving a radiant panel header, laterally overcoming the latter. The sheath, on a side thereof intended to be turned to a wall 1, includes a pair of legs, i.e. an upper leg 18 and a lower leg 18' projecting from such sheath. The legs are intended to be hooked to a complementary template for mounting the panel onto a wall 17. The template includes a L-profile having a wing 17' to be attached to the wall and another wing endowed with a plurality of parallel continuous ridges 17" turned upside. The panel is mounted by putting the upper leg in a groove defined between the ridges, the panel is then supported by the internal abutting of the leg onto the top of an outer ridge 17''', i.e. the last ridge in the direction away from the wall. A blocklet 19 having a groove 19' is an element for stabilizing the assembly of the panel. Lower leg 18' is received in groove 19' of blocklet 19. Respective header-coverings with relevant templates equip the upper and the lower header of a panel. The header-coverings, laterally projecting beyond the panels, can protect pipe fittings.

Figure 9:
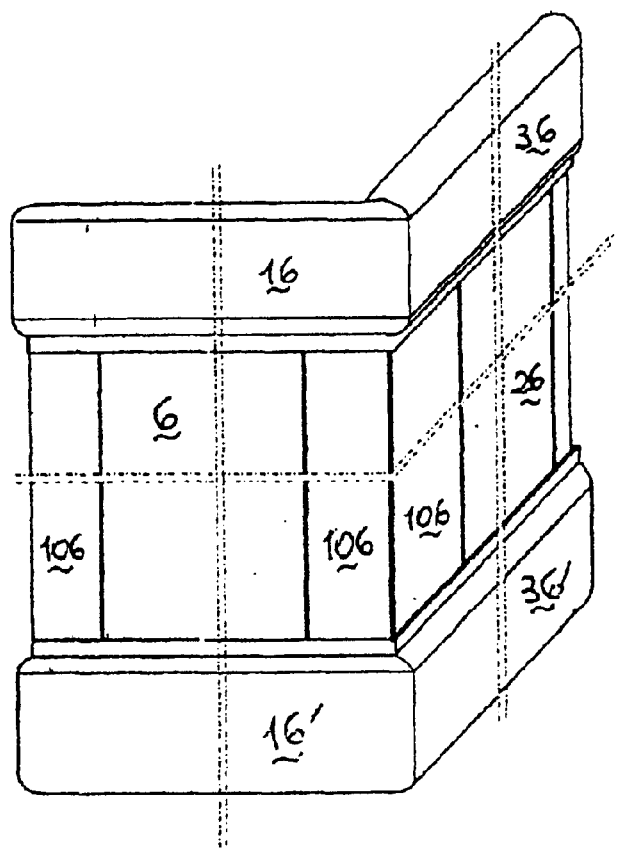
FIG. 9 shows an angled assembly of two radiant panels according to this invention.

In FIG. 9 the connection is depicted of two radiant panels 6, 26 in an angled configuration. Header-coverings 16, 36 have angled cuts at their junctions, so allowing a continuity of the covering. The space between the header-coverings not occupied by the radiant panels is filled with filling staves 106.

This invention has been disclosed referring to specific embodiments thereof, but it is to be expressly understood that additions, variations and omissions can be made without departing from its protection scope, as defined by the appended claims.

What is claimed is:

1. In a system for the thermoregulation of a room, including a source for feeding a thermovector liquid; radiant panels wherein said thermovector liquid passes; pipings for delivering/returning thermovector liquid to/from said radiant panels; each radiant panel including a first manifold; a second manifold, and, between the first manifold and the second manifold, a radiant element which has two radiating front surfaces and a width from the one to the other radiating surface; an interior, and, in such interior, parallel contiguous rectilinear channels having a rectangular cross-section and entirely sweeping said radiating front surfaces with respective radiating sides, from the first to the second manifold; said channels being each one in liquid communication with said manifolds through respective ports provided in the manifolds;

the improvement wherein said manifolds have respective eccentric profiles endowed with respective slits, wherein said ports open, and said radiant element is built by inserting discrete channel elements, each one confining in an interior thereof one of said parallel contiguous rectilinear channels having a rectangular cross-section, into said slits by opposite extremities thereof, the channel elements being forced into the slits through gasket means and being arranged in a side-by-side relationship; and wherein said channels have the lesser side of the rectangular cross-section thereof in the direction of the width of the radiant panels.

2. The system for the thermoregulation of a room as defined in claim 1, wherein the panels are endowed with frame means fit for receiving a radiant panel in an interior thereof; the frame means and the radiant panels being endowed with respective complementary lock means and with hinge means for hinging a radiant panel on the frame means, the hinge means including hinged hydraulic fittings, and the frame means being endowed with hydraulic fitting means for a connection to a thermovector liquid feed circuit.

3. The system for the thermoregulation of a room as defined in claim 1, further including thermostat means to control the switching ON/OFF of said source, which thermostat means include a case and a cylindrical thermosensitive element arranged outside said case, upon it, the axis of symmetry of the thermosensitive element intended to be arranged in a vertical position in a mounting position of the thermostat means.

4. The system for the thermoregulation of a room as defined in claim 1, further including a radio transmitter and a counter for counting the times of activation of the source; and a radio receiver, and a warning light arranged on a radiant panel; the radio transmitter signalling the ON/OFF state of the source to the radio receiver and correspondingly determining the ON/OFF state of said warning light.

5. The system for the thermoregulation of a room as defined in claim 1, further including a tank for a liquid against carbonaceous deposits, which tank is shunted to the return piping, through two check-valves, a gate valve being mounted on the branch of return piping on which the shunt insists, to stop/reenable the flow of thermovector liquid.

6. The system for the thermoregulation of a room as defined in claim 1, wherein said radiant panels are connected to said delivery and return pipings through gasketed quick fittings.

7. The system for the thermoregulation of a room as defined in claim 1, wherein said radiant panels are equipped with lower and upper header-coverings, having such a length as to project beyond the sides of a panel when mounted on them; which header-coverings are endowed with respective upper and lower legs, and are equipped with templates that include a L-profile having a wing to be hooked to a wall and a support wing that has continuous parallel ridges fit for supportingly engaging said upper legs, and equipped with blocklets to be mounted between said support wing and said lower leg, receiving this one in a groove provided in the blocklets themselves.

8. The system for the thermoregulation of a room as defined in claim 1, wherein said channel elements are made up of polycarbonate.

* * * * *